(12) United States Patent
Kasten et al.

(10) Patent No.: US 7,200,910 B2
(45) Date of Patent: Apr. 10, 2007

(54) SYSTEM AND METHOD OF DISPOSING A SUBSTRATE IN A HOUSING

(75) Inventors: Alan E. Kasten, New Berlin, WI (US); Bruce E. Mattrisch, Oak Creek, WI (US); Jeff S. Johnson, Waukesha, WI (US)

(73) Assignee: Delphi Technologies, Inc., Troy, MI (US)

( * ) Notice: Subject to any disclaimer, the term of this patent is extended or adjusted under 35 U.S.C. 154(b) by 160 days.

(21) Appl. No.: 10/695,538

(22) Filed: Oct. 28, 2003

(65) Prior Publication Data

US 2005/0086782 A1 Apr. 28, 2005

(51) Int. Cl.
*B23Q 17/22* (2006.01)
*B23Q 15/00* (2006.01)

(52) U.S. Cl. .............. 29/407.04; 29/407.09; 29/407.1; 29/464; 29/466; 29/468; 29/890; 29/702; 29/720; 29/721; 700/57; 700/275; 700/279; 700/302; 356/622; 356/614

(58) Field of Classification Search ............ 29/407.04, 29/407.09, 407.1, 464, 466, 468, 469, 890, 29/714, 702, 703, 709, 720, 721; 700/17, 700/57, 62, 275, 279, 302; 356/622, 614, 356/615
See application file for complete search history.

(56) References Cited

U.S. PATENT DOCUMENTS

| | | | |
|---|---|---|---|
| 2,155,248 A * | 4/1939 | Adams et al. .......... 356/393 |
| 3,965,562 A * | 6/1976 | Inoyama .............. 29/407.04 |
| RE32,910 E * | 4/1989 | Stuckler ............... 29/407.04 |
| 5,224,052 A * | 6/1993 | Hamar ................... 700/192 |
| 5,249,349 A * | 10/1993 | Kuinose et al. ........... 29/721 |
| 5,455,765 A * | 10/1995 | Pryor ..................... 700/62 |
| 5,619,782 A * | 4/1997 | Tanaka et al. .......... 29/407.1 |
| 5,701,661 A * | 12/1997 | van den Brink .......... 29/721 |
| 6,026,552 A * | 2/2000 | Matsumoto ........... 29/704.04 |
| 6,141,863 A * | 11/2000 | Hara et al. ............... 29/714 |
| 6,170,163 B1 * | 1/2001 | Bordignon et al. ......... 33/16 |
| 6,317,980 B2 * | 11/2001 | Buck, III ............. 29/897.31 |
| 6,367,141 B1 * | 4/2002 | Cook et al. ............ 29/407.1 |
| 6,438,833 B1 * | 8/2002 | Cook et al. ........... 29/888.01 |
| 6,484,381 B2 * | 11/2002 | Cunningham et al. ... 29/407.09 |
| 6,532,659 B1 * | 3/2003 | DeSousa et al. .......... 29/890 |
| 6,643,002 B2 * | 11/2003 | Drake, Jr. ............... 356/72 |
| 6,741,809 B1 * | 5/2004 | Chang ................... 396/431 |
| 6,762,847 B2 * | 7/2004 | Duquette et al. ......... 356/614 |
| 6,931,738 B2 * | 8/2005 | Bodgren et al. ........... 33/286 |
| 2004/0194296 A1 * | 10/2004 | Kosuge et al. ............ 29/714 |

FOREIGN PATENT DOCUMENTS

JP 63196333 A * 8/1988
JP 63196334 A * 8/1988

\* cited by examiner

*Primary Examiner*—Essama Omgba
(74) *Attorney, Agent, or Firm*—Paul L. Marshall

(57) ABSTRACT

A method of making a gas treatment device, the method includes projecting a laser line onto a side of substrate from a laser line generator angled away from a viewing source; projecting a laser dot onto the substrate from a laser dot generator located above the viewing source; verifying an alignment of the substrate with at least one of: another substrate and a housing by comparing the laser line projection on the substrate to the laser dot projection on the substrate, wherein the alignment is verified when the laser line projection and the laser dot projection are co-linear; and stuffing the substrate into the housing.

18 Claims, 4 Drawing Sheets

SYSTEM AND METHOD OF DISPOSING A SUBSTRATE IN A HOUSING

BACKGROUND

Gas, e.g., exhaust gas, treatment devices such as catalytic converters, evaporative emissions devices, hydrocarbon scrubbing devices, diesel particulate traps, non-thermal plasma reactors, and the like, are employed in various applications to physically and/or catalytically treat environmentally unfriendly gas emissions. Such gas treatment devices incorporate a substrate, support, monolith, or brick, which includes a catalyst material coated thereon. A mounting device such as a retention material comprising an intumescent material, non-intumescent material, or a combination of both, is disposed about the substrate forming a retention material/substrate subassembly, prior to being inserted into the gas treatment device's housing.

Generally, the term "substrate", as used herein, may be used to refer to any high temperature (i.e., temperatures up to about 1000° C.) material, such as ceramic, metallic foils, combinations thereof, and other materials, with ceramic preferred, which is formed to provide a great number of gas passages capable of allowing exhaust fluid flow therethrough. As mentioned, the substrate employed in the catalytic converter may comprise a ceramic material, which may be susceptible to breakage if forces produced during a stuffing operation exceed a threshold value. Moreover, breakage may result, for example, from a rotation of a major axis of the substrate relative to a major axis of the shell/housing and stuffing cone (which may also be referred to as a stuffing cone apparatus, assembly or simply as cone). Similarly, when two or more substrates are employed rotation relative to each other may cause breakage. Commonly, an operator of a stuffing machine is responsible for determining whether a substrate is aligned within the shell, or if two or more substrates are employed, for determining whether they are aligned in relation to each other. With no visual reference other than, for example, the substrate profile, this alignment is a difficult task, wherein an operator's misjudgment may result in breakage of the substrate.

Therefore, what is needed in the art is a reliable method of determining the alignment of a substrate relative to a shell and/or relative to other substrates being stuffed into a shell.

SUMMARY

One embodiment of a method of making a gas treatment device, the method comprises projecting a line laser line onto a side of substrate from a laser line generator angled away from a viewing source; projecting a laser dot onto the substrate from a laser dot generator located above the viewing source; verifying an alignment of the substrate within at least one of: another substrate and a housing by comparing the laser line projection on the subassembly to the laser dot projection on the subassembly, wherein the alignment is verified from the viewing source when the laser line projection and the laser dot projection are co-linear; and stuffing the substrate into the housing.

Another embodiment of a method of making a gas treatment device, the method comprises projecting a laser line onto a side of at least two substrates from a laser line generator; verifying an alignment of the at least two substrate from a viewing source; and stuffing the at least two substrates into a housing.

One embodiment of a system for making a gas treatment device comprises a laser dot generator positioned at an angle delta of about 40° up to about 50° relative to a horizon; a laser line generator positioned an angle beta of about 40° up to about 50° relative to the horizon and at an angle omega of about 80° to about 100° relative to the laser dot generator; a viewing source positioned at an angle of less than or equal to about 15° relative to the laser dot generator; and a stuffing cone disposed downstream of the laser dot generator.

Another embodiment of a system for making a gas treatment device comprises a laser line generator; a viewing source positioned at an angle kappa of about 40° up to about 50° relative to the laser line generator; and a stuffing cone disposed downstream of the laser line generator.

The above-described and other features will be appreciated and understood by those skilled in the art from the following detailed description, drawings, and appended claims.

DRAWINGS

Referring now to the figures, which are exemplary embodiments, and wherein the like elements are numbered alike:

DETAILED DESCRIPTION

Figure 1:
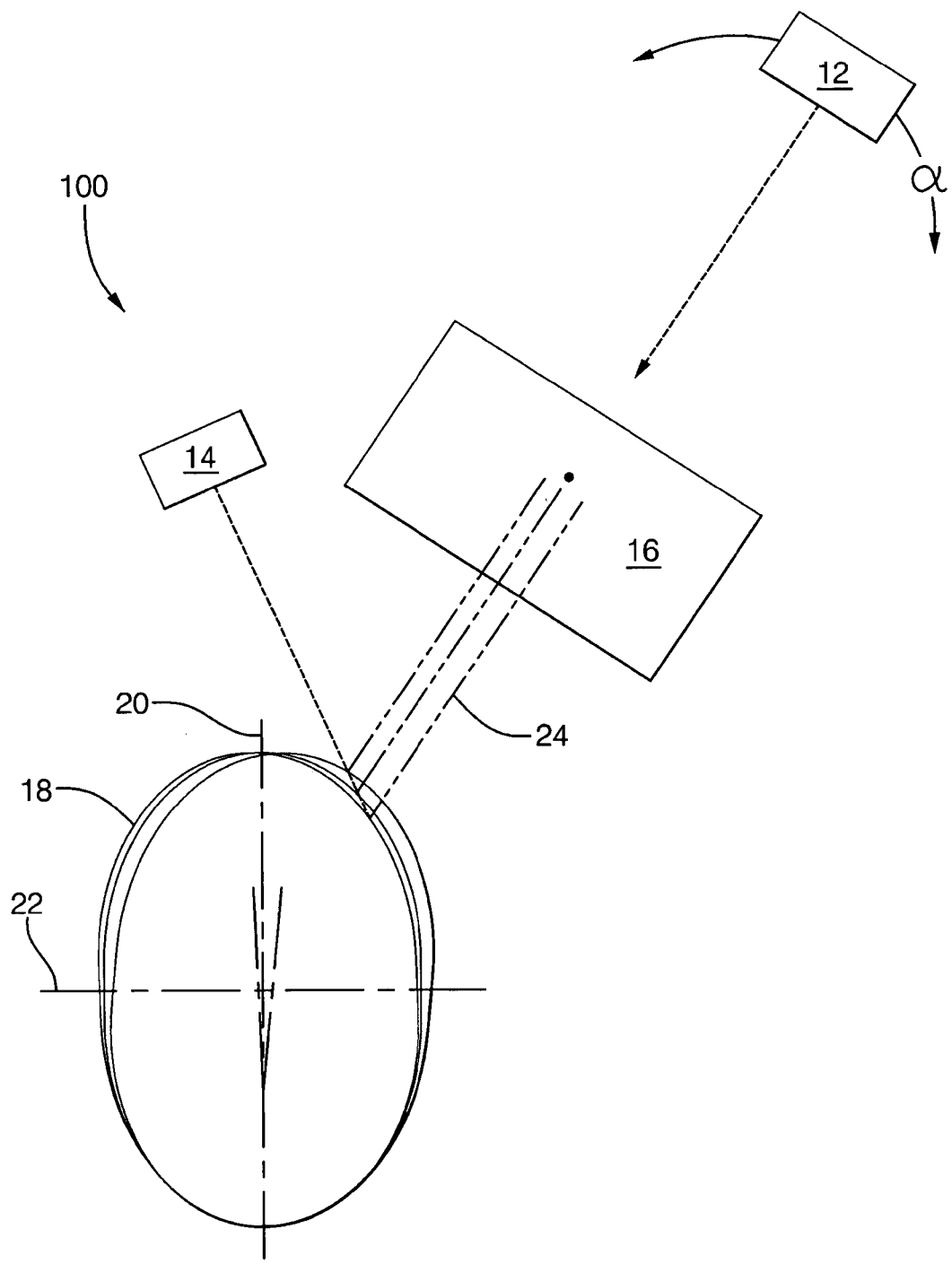
FIG. 1 is a top view of a substrate with a schematic representation of a rotation sensing system.

Although described in connection with a catalytic converter, it is to be understood that the method of forming a gas treatment device may be used for any device where a non-round substrate is stuffed into a housing, e.g., other exhaust emission control devices, such as evaporative emissions devices, scrubbing devices (e.g., hydrocarbon, sulfur, and the like), particulate filters/traps, adsorbers/absorbers, plasma reactors (e.g., non-thermal plasma reactors), and the like, as well as combinations comprising at least one of the foregoing devices.

Generally, a catalytic converter comprises substrate(s) comprising a catalyst; a shell (also known as a housing) disposed around the substrate(s); and a retention material disposed between the substrate(s) and the shell, and may be concentrically disposed around the substrate(s).

Substrate(s) can comprise any material designed for use in a spark ignition or diesel engine environment and having the following characteristics: (1) capable of operating at temperatures up to about 600° C., and up to about 1,000° C. for some applications, depending upon the device's location within the exhaust system (manifold mounted, close coupled, or underfloor) and the type of system (e.g., gasoline or diesel); (2) capable of withstanding exposure to hydrocarbons, nitrogen oxides, carbon monoxide, particulate matter (e.g., soot and the like), carbon dioxide, and/or sulfur; and (3) having sufficient surface area and structural integrity to support a catalyst, if desired. Some possible materials include cordierite, silicon carbide, metal, metal oxides (e.g., alumina, and the like), glasses, and the like, and mixtures comprising at least one of the foregoing materials. Some ceramic materials include "Honey Ceram", commercially available from NGK-Locke, Inc, Southfield, Mich., and "Celcor", commercially available from Corning, Inc., Corning, N.Y. These materials can be in the form of foils, perform, mat, fibrous material, monoliths (e.g., a honeycomb structure, and the like), other porous structures (e.g., porous glasses, sponges), foams, pellets, particles, molecular sieves, and the like (depending upon the particular device), and combinations comprising at least one of the foregoing materials and forms, e.g., metallic foils, open pore alumina sponges, and porous ultra-low expansion glasses. Furthermore, these substrates can be coated with oxides and/or hexaaluminates, such as stainless steel foil coated with a hexaaluminate scale.

Although the substrate(s) can have any size or geometry, the size and geometry are preferably chosen to optimize surface area in the given exhaust emission control device design parameters. The substrate may have a honeycomb geometry, with the combs through-channel having any multi-sided or rounded shape, with substantially square, triangular, pentagonal, hexagonal, heptagonal, or octagonal or similar geometries preferred due to ease of manufacturing and increased surface area. Meanwhile, the cross-sectional geometry of the substrate, e.g., taken perpendicular to the major axis of the substrate can be rounded or polygonal. The alignment system described herein is particularly useful with non-circular geometries (e.g., oval, elliptical, triangular, square, pentagonal, hexagonal, heptagonal, octagonal, and the like).

Depending upon the exhaust emission control device, optionally disposed on and/or throughout the substrate(s) can be a catalyst capable of reducing the concentration of at least one component in the gas (e.g., via catalytic reaction or adsorption). If multiple substrates are employed, each substrate can comprise the same or different catalyst compositions. For example, an upstream substrate could comprise a NOx adsorbing material while a downstream substrate could comprise a three-way catalyst. The catalyst may comprise one or more catalyst materials that are wash coated, imbibed, impregnated, physisorbed, chemisorbed, precipitated, or otherwise applied to the substrate. Possible catalyst materials include metals, such as platinum, palladium, rhodium, iridium, osmium, ruthenium, tantalum, zirconium, yttrium, cerium, nickel, manganese, copper, and the like, as well as oxides, alloys, and combinations comprising at least one of the foregoing catalyst materials, and other catalysts.

The catalyst material may be combined with additional materials or sequentially disposed on the substrate with these additional materials. The additional materials may comprise oxides (e.g., alumina, zirconia, titania, and the like), aluminides, hexaaluminates, and the like, and combinations comprising at least one of the foregoing. The additional materials may further comprise stabilizing agents, such as, Group II metals, rare earth metals, Group VIII metals, and the like, as well as, oxides, alloys, and combinations comprising at least one of the foregoing. Preferred stabilizing agents include barium, platinum, palladium, osmium, strontium, lanthanum, ruthenium, iridium, praseodymium, rhodium, gold, manganese, cobalt, and the like, as well as, oxides, alloys, and combinations comprising at least one of the foregoing, with barium, lanthanum, and combinations comprising at least one of the foregoing particularly preferred.

Located between the substrate and a shell can be a retention material that insulates the shell from both the high exhaust gas temperatures and the exothermic catalytic reaction occurring within the substrate. The retention material, which enhances the structural integrity of the substrate by applying compressive radial forces about it, reducing its axial movement and retaining it in place, and may be concentrically disposed around the substrate to form a retention material/substrate subassembly.

The retention material, which can be in the form of a mat, particulates, or the like, can either be an intumescent material (e.g., a material that comprises vermiculite component, i.e., a component that expands upon the application of heat), a non-intumescent material, or a combination thereof. These materials can comprise ceramic materials (e.g., ceramic fibers) and other materials such as organic and inorganic binders and the like, or combinations comprising at least one of the foregoing materials. Non-intumescent materials include materials such as those sold under the trademarks "NEXTEL" and "INTERAM 1101HT" by the "3M" Company, Minneapolis, Minn., or those sold under the trademark, "FIBERFRAX" and "CC-MAX" by the Unifrax Co., Niagara Falls, N.Y., and the like. Intumescent materials include materials sold under the trademark "INTERAM" by the "3M" Company, Minneapolis, Minn., as well as those intumescents which are also sold under the aforementioned "FIBERFRAX" trademark, as well as combinations thereof and others.

The retention material/substrate subassembly can be concentrically disposed within a shell or housing. The choice of material for the shell depends upon the type of exhaust gas, the maximum temperature reached by the substrate, the maximum temperature of the exhaust gas stream, and the like. Suitable materials for the shell can comprise any material that is capable of resisting under-car salt, temperature, and corrosion. For example, ferrous materials may be employed such as ferritic stainless steels. Ferritic stainless steels can include stainless steels such as, e.g., the 400— Series such as SS-409, SS-439, and SS-441, with grade SS-409 generally preferred.

Also similar materials as the housing, end cone(s), end plate(s), exhaust manifold cover(s), and the like, can be concentrically fitted about the one or both ends and secured to the housing to provide a gas tight seal. These components can be formed separately (e.g., molded or the like), or can be formed integrally with the housing using methods such as, e.g., a spin forming, or the like.

The exhaust emission control device can be manufactured by one or more techniques, and, likewise, the retention material/substrate subassembly can be disposed within the shell using one or more methods. For example, the retention material/substrate subassembly can be inserted into a variety of shells using a stuffing cone. The stuffing cone is a device that compresses the retention material concentrically about the substrate. The stuffing cone then stuffs the compressed retention material/substrate subassembly into the shell, such that an annular gap preferably forms between the substrate and the interior surface of the shell as the retention material becomes compressed about the substrate. Alternatively, if the retention material is in the form of particles (e.g., pellets, spheres, irregular objects, or the like) the substrate can be stuffed into the shell and the retention material can be disposed in the shell between the substrate and the shell.

In order to prevent breakage of the substrate during this stuffing operation, the alignment of the substrate with the shell is verified and/or the alignment of the at least two substrates relative to each other is verified. The term alignment, as used herein, refers to alignment of the major axis of the substrate relative to the shell or relative to at least one other substrate. In other words, a perfect alignment is when the major axis of the substrate is in the same line as the major axis of the shell or the major axis of at least one other substrate. For example, if a substrate is being stuffed into a shell vertically, the major axis is substantially vertical, i.e., within some pre-determined limit, when stuffed into the housing. More over, if a substrate is being stuffed into a shell horizontally, the major axis is horizontal, within some pre-determined limit. Additionally, if the stuffing cone apparatus is positioned at an angle relative to the horizon, the substrate is aligned, when it is stuffed into the shell, at the same angle to the horizon, within some pre-determined limit.

Referring now to FIG. 1, a rotation sensing system generally designated 100 is illustrated. The rotation sensing system 100 comprises a laser dot generator 12, a laser line generator 14, a viewing source 16, and a work piece 18. While work piece 18 may comprise any non-cylindrical geometry, the work piece 18 of this example is an oval shaped substrate having a major axis 20 and a minor axis 22. Major axis 20 is the vertical axis. Rotation (i.e., vertical rotation) in major axis 20 is shown schematically by shifts in the line representing major axis 20.

As will be discussed in greater detail, laser dot generator 12 projects a laser dot onto the oval side of substrate (i.e., work piece 18) from a location above and behind viewing source 16 (e.g., an operator or a vision system capable of viewing the laser dot and laser) at an angle substantially equal to a visual perspective of viewing source 16. Alignment of substrate may be verified by comparing the laser line projection on substrate to the laser dot projection on the substrate, wherein an alignment is determined from viewing source 16 when the laser line projection and the laser dot projection are co-linear. In other words, when major axis 20 of the oval substrate (18) is vertical, the laser line projected onto the substrate by laser line generator 14 and the laser dot projected onto the substrate by laser dot generator 12 appear co-linear to viewing source 16. If the catalyst is rotated so that major axis 20 is no longer vertical, the projected laser line will appear to be shifted, either up or down, from the projected laser dot. In other words, the projected laser dot will appear to be in the same location, but it will no longer be co-linear with the projected laser line. In FIG. 1, lines 24 represent the shift observed from viewing source 16. The visual feedback provided by this system 100 allows an operator of a stuffing machine to adjust the positioning of substrate, thus reducing the possibility of breakage due to misalignment.

Figure 2:
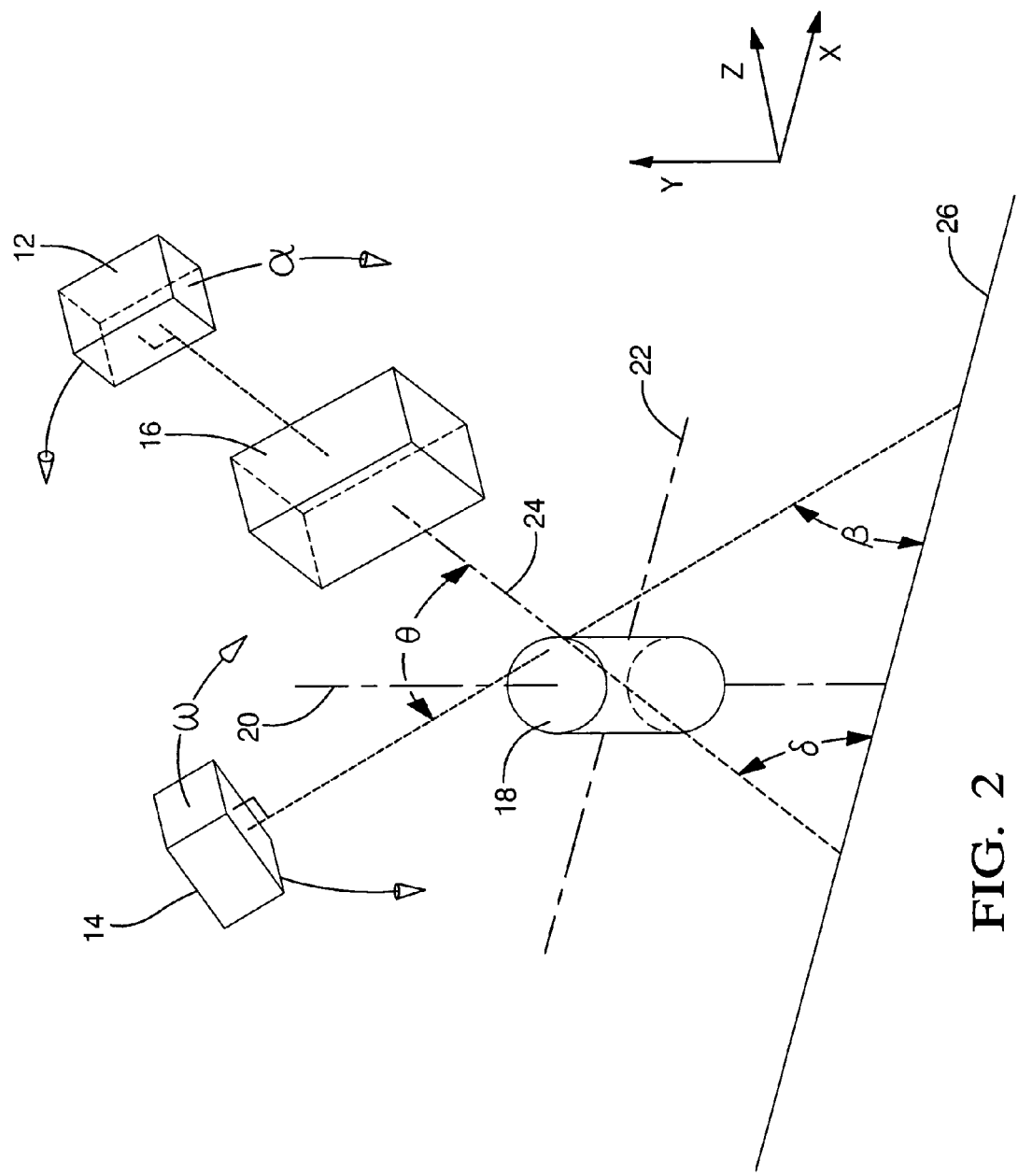
FIG. 2 is a three dimensional schematic representation of the rotation sensing system as illustrated in FIG. 1.

Referring now to FIG. 2, which is three dimensional schematic representation of system 100, the laser dot generator 12 may be positioned anywhere in the system 100, as long as laser dot generator 12 is positioned in the system 100 relative to line generator 14 and viewing source 16 such that viewing source 16 is capable of observing a shift in the work piece 18 as discussed above. For example, the laser dot generator 12 may be positioned on either side of the viewing source 16, wherein the laser dot generator 12 is positioned at an angle a (angle alpha) less than or equal to 15° away from the viewing source 16, with an angle of less than or equal to about 10° more preferred, and most preferred is a position where the laser dot generator 12 is in the same line as viewing source 16 (i.e., a 0° degree angle relative to viewing source 16). Moreover, the laser dot generator 12 may be positioned at an angle δ (angle delta) relative to a horizon 26 (e.g., the floor of the manufacturing facility). For example, the laser dot generator 12 may be positioned at an angle of about 40° up to about 50° relative to the horizon, with an angle of about 42° to about 45° preferred. Additionally, laser dot generator 12 is positioned at an angle θ (angle theta) relative to laser line generator 14, such that the laser line generator 14 is capable of projecting a laser line in the general direction of the viewing source 16. For example, the laser dot generator 12 is positioned to project a dot tat meets the laser line from laser line generator 14 at an angle of about 80° to about 100°, with an angle of about 85° to about 95° more preferred.

Similarly, laser line generator 14 may also be positioned at an angle relative to the horizon 26. For example, the laser line generator 14 may be positioned at an angle β (angle beta) of about 40° up to about 50° relative to the horizon, with an angle of about 42° to about 45° preferred. Moreover, the laser line generator may be position at any an angle away from the viewing source 16, such that viewing source 16 is capable of viewing a shift in the work piece as discussed above. For example, the laser line generator may be positioned at on angle ω (angle omega) of about 80° to about 100° relative to the viewing source 16, with an angle of about 85° to about 95° more preferred.

In an exemplary embodiment, laser dot generator 12 and laser line generator 14 may comprise a commercially available laser device comprising a lens, splitter, or the like, as is appropriated to produce the desired line or dot for each respective function. Preferably, the laser device produces a light observable by the human eye. In other words, the apparatus that generates a laser dot and the apparatus that generates a laser line may be the same type of apparatus, with the exception of the added lens, light splitter, or the like as discussed above. The laser dot generator 12 and laser line generator 14 are capable of generating a laser dot or a laser line that may be observable from viewing source 16. For example, the laser dot generator 12 is capable of generating a laser dot having a diameter up to about 0.5 inches, within this range a diameter up to about 0.25 inches (6.35 millimeters (mm)) may be preferred. Similarly, the laser line generator 14 may generate a laser line having a width up to about 0.5 inches (12.7 mm), with a width of up to about 0.25 inches (6.35 mm) more preferred. Additionally, the laser line may have any length sufficient to be observable by viewing source 16. For example, the laser line may have a length from about 3 inches (76.2 mm) to about 9 inches (228.6 mm), within this range a length of about 4 inches (101.6 mm) to about 6 inches (152.4 mm) may be preferred for most applications.

Viewing source 16 may be, for example, a human operator of the stuffing machine, since the projected laser line and the projected laser dot may be capable of being observed by a human eye. As such, the operator upon seeing that the projected laser line and the projected laser dot are not co-linear may adjust the substrate as discussed above. In other embodiments, a commercially available vision system may be programmed to monitor the relationship between the projected laser line and the projected laser dot to prevent initiation of the machine cycle if a co-linear relationship is not detected, The vision system is cable of sensing differences in light adsorption of a material. For example, the laser dot and/or laser line will appear as being brighter projected against the darker substrate as observed by the vision system. As such, the vision system will be able to detect the relative position of the laser dot and laser line on the substrate. The vision system may be then be used to provide feedback as to whether the substrate is aligned relative to the shell and or relative to another substrate. Based on this feedback, the stuffing machine can be shut dawn and/or the substrate position can be adjusted. For example, the human operator may adjust the position of the substrate based on this feedback.

Figures 3, 4:
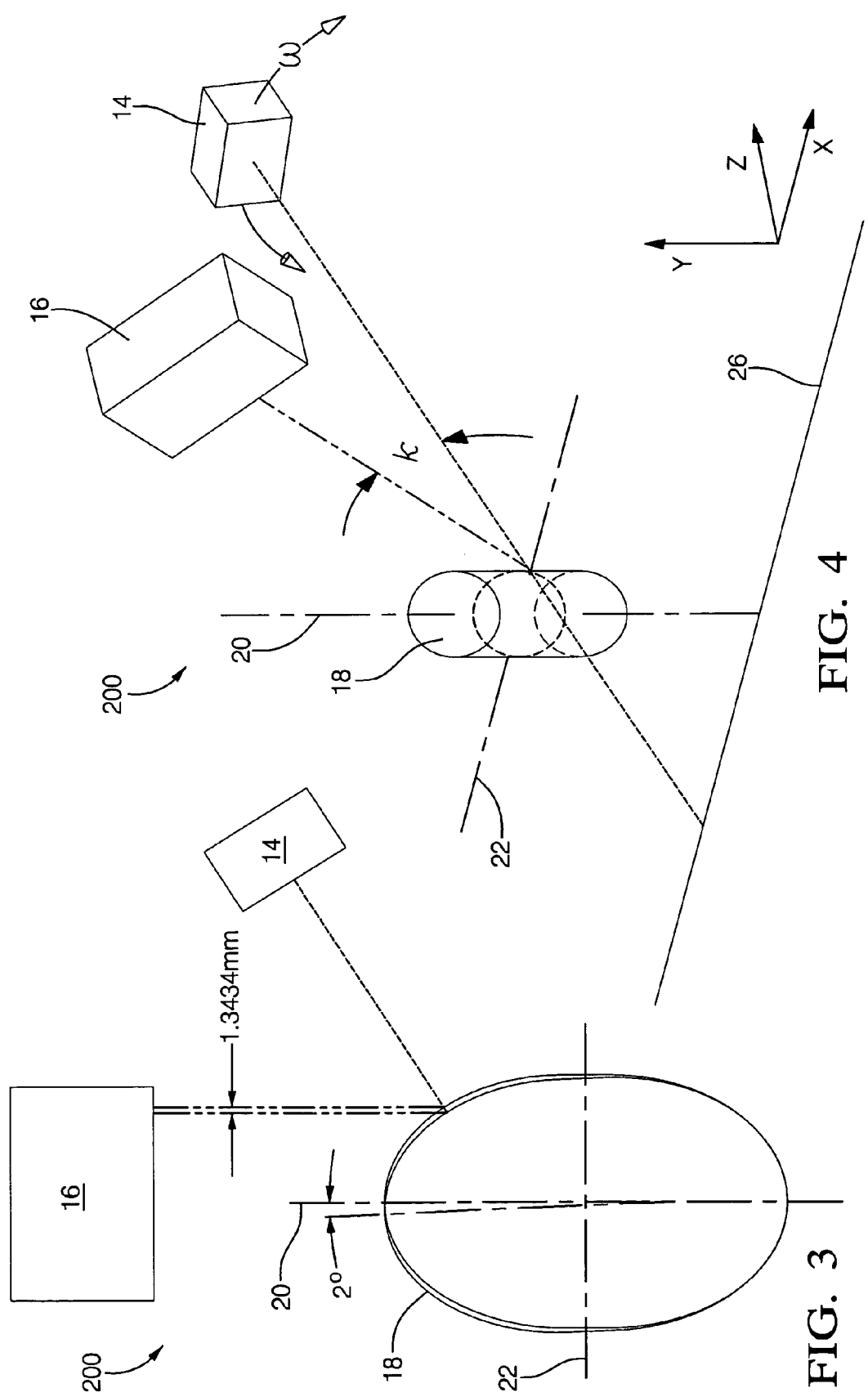
FIG. 3 is a top view of a substrate with a schematic a vision system of a representation of another embodiment of a rotation sensing system.
FIG. 4 is a three dimensional schematic representation of the rotation sensing system as illustrated in FIG. 3.

FIGS. 3-4 illustrates a rotation sensing system generally designated 200, which may be used to determine the alignment of at least two substrates prior to stuffing. The system comprises a laser line generator 14, a viewing source 16, and a work piece 18 having a major axis 20. In this example, work piece 18 comprises at least two oval shaped substrates. As will be discussed in greater detail, laser line generator 14 projects a laser line onto the oval side of the substrates. Viewing source 16 (e.g., a "low tech vision system") is positioned at an angle κ (angle kappa) relative to laser line generator 14, such that viewing source 16 is capable of observing a "split" in the laser line if the substrates are not aligned relative to each other. The term "split" is used herein to generally describe the perceived shift in the laser line observed from the viewing source 16 if the substrates are not aligned relative to each other within a pre-determined tolerance. If work piece 18 is aligned, i.e., the at least two oval substrates are aligned, the projected laser line will appear to be unbroken to viewing source 16. If the at least two oval catalysts are not aligned, as shown if FIG. 3, the laser line will appear to be broken and shifted where it crosses the plane representing the adjoining faces of the substrates.

For example, FIG. 3 illustrates a two-degree rotational misalignment of the oval shaped substrates, which results in a 1.34 millimeters (mm) break in the projected laser line when viewed at a 45-degree angle, i.e., when angle kappa is a 45-degree angle. The vision system detects this shift and, if it exceeds a pie-determined limit, prevents the stuffing machine cycle from proceeding. Moreover, if a human operator is the viewing source, the human operator may visually see the shift in the line across the joint of the two substrates and may rake appropriate actions to align the substrates prior to the stuffing operation.

In embodiments where the work piece 18 comprises at least two substrates, the laser line generator 14 may be positioned such that a laser line projected onto the substrate is perpendicular to the joint of the substrates. For example, if the substrates are being arranged vertically, the joint where the two substrates abut is horizontal. In this configuration, the laser line is projected vertically across the joint. In embodiments where the substrates are positioned horizontally, the laser line generator is positioned such that a laser line is projected horizontally onto the substrate, as the joint between the abutting substrate is vertical in that case. Additionally, the laser line generator 14 may be positioned at an angle kappa of about 40° up to about 50° relative to the viewing source 16, with an angle of about 42° to about 45° preferred.

If the substrate(s) are aligned within a pre-determined limit (i.e., within a pre-set variance), the substrate(s) are then stuffed into a housing(s) using a stuffing cone apparatus. The stuffing cone apparatus may be located downstream of the laser dot generator 12 and/or laser line generator 14. The term "downstream", as used herein, generally describes the location of the stuffing cone apparatus relative to the laser dot generator 12 and/or laser line generator 14. For example, the stuffing cone apparatus may be located some distance away from either the laser dot generator 12 and/or laser line generator such that the substrate may be disposed with the housing using the stuffing cone apparatus, after the alignment of the substrate has been verified. Moreover, in the systems illustrated in FIGS. 2 and 4, the cone may be located in alignment with the major axis 20 of work piece 18.

In this method, the outlet of the stuffing cone, which is disposed adjacent to the inlet of the housing, has an inner diameter less than the inner diameter of the housing. As the retention material/substrate subassembly moves through the stuffing cone toward the housing, the stuffing cone compresses the retention material about the substrate so that the subassembly may be disposed into the housing. More particularly, as the retention material/substrate subassembly slides against the inwardly tapered interior of the stuffing cone, the retention material compresses about the substrate until the retention material substrate subassembly has an outer diameter less than the housing outer diameter. At this point, the retention material/substrate subassembly is pushed into the housing.

An exemplary stuffing cone apparatus comprises a funnel and a pusher detail. The funnel comprises a conduit with an interior tapered inwardly from a first end toward an opposing second end. The first end comprises a diameter large enough to accept a retention material/substrate subassembly. The opposing second end comprises a diameter that is less than or equal to the internal diameter of the main body of a housing, which is used to house the retention material/substrate subassembly after placement therein by the stuffing cone apparatus. Optionally, the second end may comprise a portion having a substantially consistent diameter (e.g., a cylindrical portion, or the like). Additionally, the funnel preferably comprises a locating cavity disposed towards the second end of the funnel for the placement of the housing.

The funnel may possess a cross-sectional geometry such as rounded (e.g., round, oval, elliptical, irregular, and the like), polygonal (e.g., triangular, square, trapezoidal, pentagonal, hexagonal, heptagonal, octagonal, and the like, as well as combinations comprising at least one of the foregoing polygonal shapes), and the like, as well as combinations comprising at least one of the foregoing geometries. With respect to the overall shape, it may be a hollow, elongated geometry capable of receiving the subassembly, compressing the retention about the substrate as the subassembly moves through the stuffing cone, and introducing the compressed subassembly to the housing. Some possible overall geometries include cylindrical, tubular, conical, and the like, with a truncated conical shape, or a combination of conical and cylindrical shapes preferred.

Disposed at the first end of the stuffing cone is a pusher detail comprising an arm, a disc, and an optional contact detail. The pusher detail is designed to slideably engage the first surface of the retention material/substrate subassembly, and force it through the stuffer funnel into the housing. Consequently, the pusher detail preferably has a main face with a geometry compatible with the area of the retention material/substrate subassembly with which it will make contact. For example, the retention material/substrate subassembly first surface may be flat, and the pusher detail may have a disc with a flat main face.

In order to compensate for retention material/substrate subassembly first surface irregularities, a contact detail may be disposed on the main face. The contact detail may comprise a compliant material, such as an elastomer (e.g., rubber, or the like), that is capable of conforming to the substrate surface upon main face engagement.

Disposed perpendicular to a surface opposite the main surface is an arm or rod that connects to the disc to form a "T", plunger, piston, or the like. The pusher detail is preferably designed to exert substantially uniform pressure across the retention material/substrate subassembly first surface.

Figure 5:
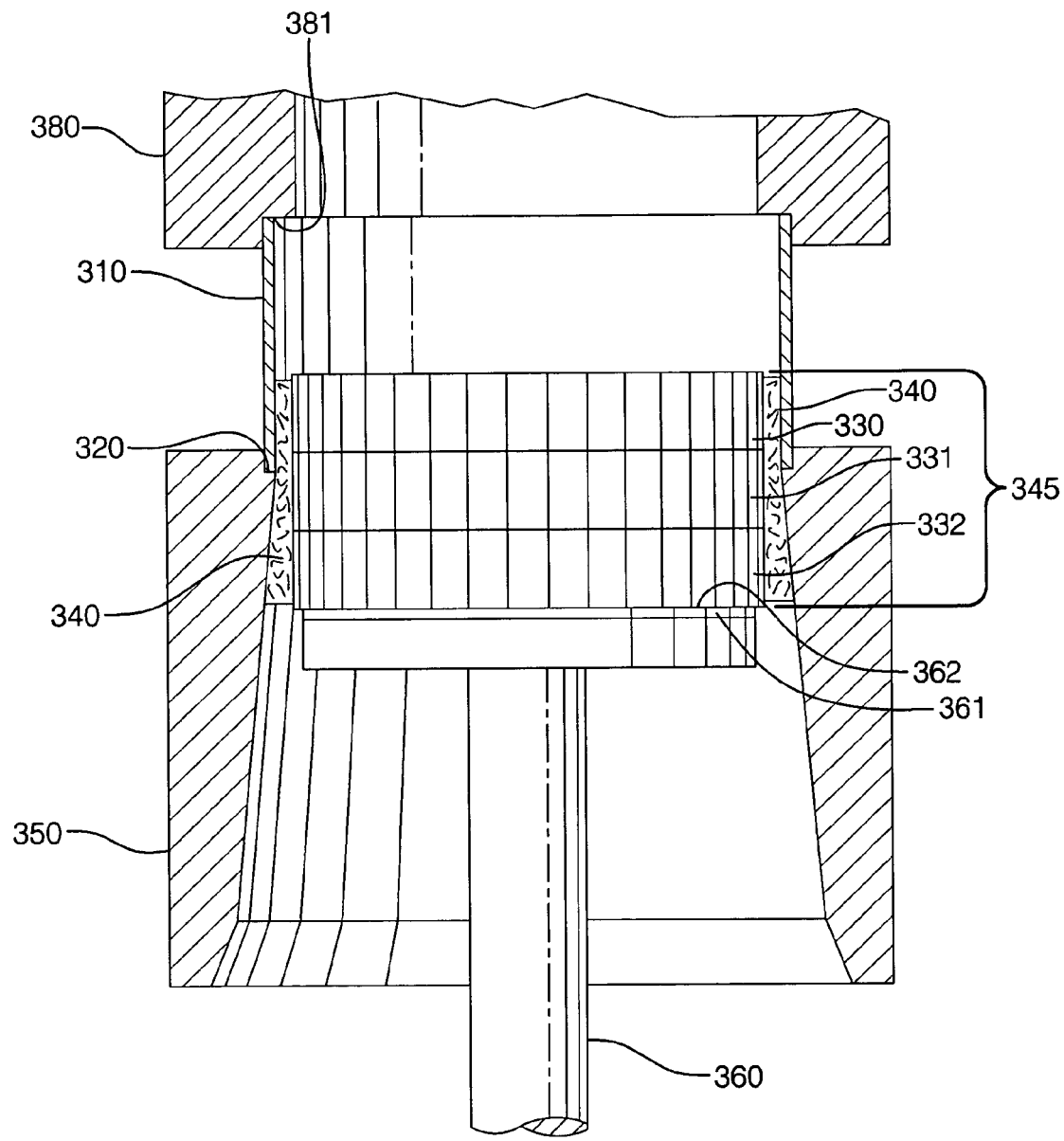
FIG. 5 is a cross-sectional view of an exhaust device stuffing cone apparatus.

Referring to FIG. 5, a stuffing apparatus generally designated 300 is illustrated. Pusher detail 360 is preferably dimensioned such that the squareness of the substrate face to the axis of travel is maintained during the stuffing operation. Retention material 340 is disposed about substrate(s) 330/

331/332 to form a retention material/substrate subassembly 345. This subassembly 345 is disposed in physical contact with both a main face of pusher detail 362. Disposed at the end of the stuffing cone 300 having the smaller diameter, in operable communication with pusher detail 360 and in physical contact with locating cavity 320, is an end of housing 310. The pusher detail 360 applies pressure to retention material/substrate subassembly 345 in the direction of the interior of housing 310.

During assembly, housing 310 is placed in locating cavity 320 in funnel 350. One or more substrates, e.g. 330, 331, 332, are wrapped in retention material 340 to form subassembly 345 that is placed in physical contact with pusher detail 360 such that a surface of subassembly 345 engages pusher compliant material 361. Pusher detail 360 applies a sufficient amount of force to subassembly 345 to force it through funnel 350 while compressing retention material 340 about substrates 330/331/332. As subassembly 345 is being pushed through funnel 350 into housing 310, funnel 350 along with housing 310 moves up against opposing springs till backup plate 380 supports it. Once subassembly 345 has passed from funnel 350 into housing 310, pusher detail 360 retracts back through funnel 350. Also funnel 350 returns, e.g., via spring action, to the original position allowing the stuffed housing assembly to be unloaded. The stuffed housing may then be further processed accordingly.

In order to accommodate unusual substrate and housing designs, pusher detail 360 may be designed to articulate such that one or more substrates, e.g., if several substrates are employed, may be moved at an angle other than parallel to the major axis of funnel 350 in order to progress through an irregularly shaped housing. Such housings may be useful in a close-coupled or manifold location.

In other embodiments, pusher detail 360 may be stationary. Subassembly 345 is placed adjacent to pusher compliant material 361. Housing 310 is placed in retaining cavity 381 and plate 380 is lowered to retain housing 310 in cavity 381. Funnel 50 and backup plate 380, with housing 310 in place, are then pushed down until subassembly 345 is entered into housing 310. Limit sensors may be used to control the position of subassembly 345 with respect to housing 310 in the end state.

Although discussed in relation to a funnel stuffing cone apparatus, it is understood by those skilled in the art that the rotation sensing system, as disclosed herein in various embodiments, may be used in other methods were alignment is a factor in assembly.

Advantageously, a method of making a gas treatment device using a rotation sensing system as disclosed herein results in a reduction in breakage of substrate material compared to a system that does not employ the rotation sensing system. Although many factors may cause the substrate to break, all else being equal, the method of alignment as disclosed herein may result in a 10 to 12 time reduction in the number of substrate breakage compared to methods not employing this alignment system. In tests performed with and without the system, greater than or equal to about 6 substrates were breaking every 24 hours. With the alignment system, less than or equal to about 2 substrates broke in a 30 day period. As such, cost savings may be realized as a result of the reduction in the frequency of breakage of a substrate.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of disposing a substrate in a housing, the method comprising:
    projecting a laser line onto a side of substrate from a laser line generator angled away from a viewing source;
    projecting a laser dot onto the substrate from a laser dot generator located above the viewing source;
    verifying an alignment of the substrate with at least one of: another substrate and a housing by comparing the laser line projection on the substrate to the laser dot projection on the substrate, wherein the alignment is verified when the laser line projection and the laser dot projection are co-linear; and
    stuffing the substrate into the housing.

2. The method of claim 1, wherein the laser dot generator is positioned at an angle alpha of less than or equal to about 15° away from the viewing source.

3. The method of claim 1, wherein the laser dot generator and the laser line generator are positioned at angles delta and beta of about 40° to about 50° relative to a horizon.

4. The method of claim 1, wherein the laser dot generator is positioned at an angle theta of about 80° to about 100° relative to the laser line generator.

5. The method of claim 4, wherein the angle theta is about 85° to about 95°.

6. The method of claim 1, further comprising wrapping a retention material around the substrate.

7. The method of claim 1, wherein the laser dot generator is positioned at an alpha angle of less than or equal to 15° away from the viewing source; wherein the laser dot generator and the laser line generator are positioned at angles delta and beta of about 40° to about 50° relative to a horizon; and wherein the laser dot generator is positioned at an angle theta of about 80° to about 100° relative to the laser line generator.

8. The method of claim 1, wherein the viewing source is a vision system.

9. The method of claim 1, wherein the substrate comprises a non-cylindrical geometry.

10. The method of claim 1, further comprising adjusting the alignment of the substrate when the laser line projection and the laser dot projection are within a predetermined variance of being co-linear.

11. A method of disposing substrates in a housing, the method comprising:
    projecting a laser line onto a side of at least two adjoined substrates from a laser line generator, wherein the laser line intersects at least one joint of the at least two adjoined substrates and the laser line generator is positioned at an angle kappa of about 40° to about 50° relative to a viewing source;
    verifying an alignment of the at least two adjoined substrates from the viewing source by determining whether the line projected on one substrate is shifted relative to the line projected on the other substrate as viewed by the viewing source; and
    stuffing the at least two adjoined substrates into a housing.

12. The method of claim 11, further comprising adjusting the alignment of the at least two substrates when the alignment is beyond a predetermined variance.

13. The method of claim 11, wherein the laser line projected onto the side of the at least two substrates is perpendicular to the at least one joint of the at least two substrates.

14. The method of claim 11, wherein the at least two substrates comprises a non-cylindrical geometry.

15. The method of claim 11, wherein the viewing source is a vision system.

16. A method of disposing substrates in a housing, the method comprising:

projecting a laser line onto a side of at least two adjoined substrates from a laser line generator such that the laser line is projected onto a portion of each substrate, wherein the laser line intersects at least one joint of the at least two adjoined substrates and the laser line generator is positioned at an angle kappa of about 42° to about 45° relative to a viewing source;

verifying an alignment of the at least two adjoined substrates from the viewing source by determining whether the line projected on the portion of one substrate is shifted relative to the line projected on the other substrate as viewed by the viewing source; and stuffing the at least two adjoined substrates into a housing.

17. A system for disposing a substrate in a housing, comprising:

a laser dot generator positioned at an angle delta of about 40° to about 50° relative to a horizon;

a laser line generator positioned an angle beta of about 40° to about 50° relative to the horizon and at an angle omega of about 80° to about 100° relative to the laser dot generator;

a viewing source positioned at an angle alpha of less than or equal to about 15° relative to the laser dot generator; and a stuffing cone disposed downstream of the laser dot generator.

18. The system of claim 17, wherein the viewing source is a vision system.

* * * * *